O. DIEFFENBACH & W. MOLDENHAUER.
PROCESS OF PRODUCING HYDROCYANIC ACID.
APPLICATION FILED APR. 16, 1908.
954,080.
Patented Apr. 5, 1910.
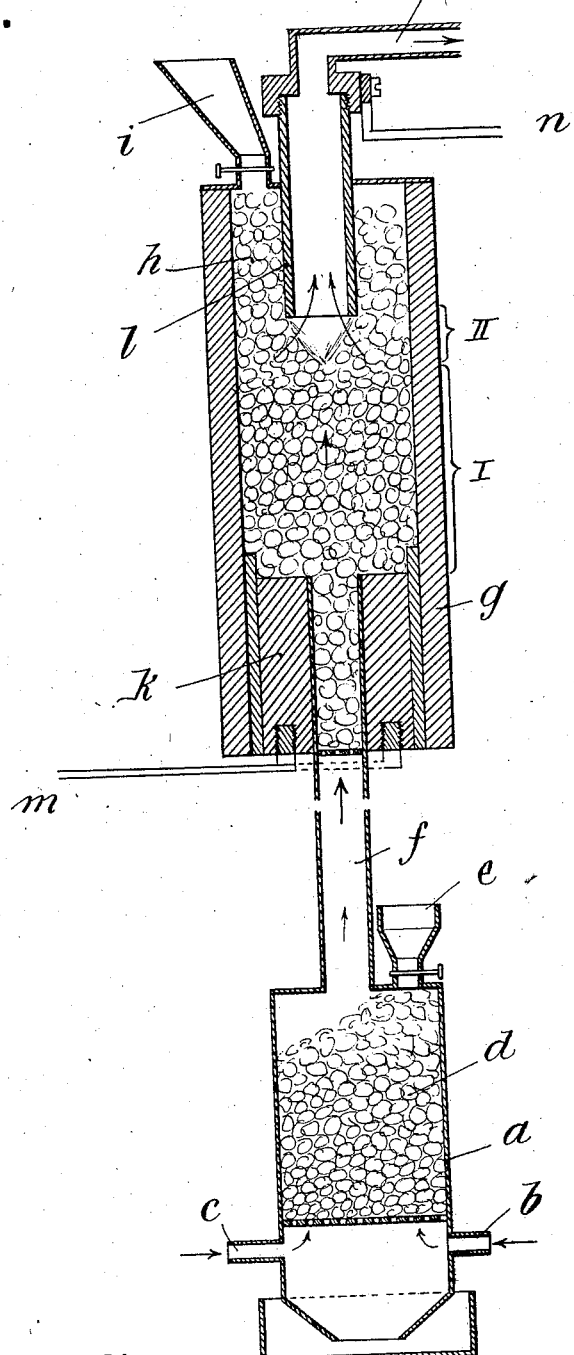

UNITED STATES PATENT OFFICE.

OTTO DIEFFENBACH AND WILHELM MOLDENHAUER, OF DARMSTADT, GERMANY.

PROCESS OF PRODUCING HYDROCYANIC ACID.

954,080.  Specification of Letters Patent.  Patented Apr. 5, 1910.

Application filed April 16, 1908. Serial No. 427,407.

*To all whom it may concern:*

Be it known that we, OTTO DIEFFENBACH, doctor of philosophy, professor at the Technical High School at Darmstadt, and WILHELM MOLDENHAUER, doctor of philosophy, lecturer at the Technical High School, both subjects of the German Emperor, and residents of Darmstadt, in the Grand Duchy of Hesse, Germany, (the post-office address of OTTO DIEFFENBACH being Ohlystrasse No. 71, that of WILHELM MOLDENHAUER Lucasweg No. 19,) have invented new and useful Improvements in Processes of Producing Hydrocyanic Acid, of which the following is a specification.

It is well known that hydrocyanic acid can be produced by passing a mixture of nitrogen and hydrogen over highly heated carbon, and recent experiments have, moreover, demonstrated that a proportional yield as high as 35% can be obtained at temperatures of about 3500° centigrade.

For the industrial application of this process a cheap and simple method of producing the necessary nitrogen-hydrogen mixture is of the highest importance. Since the production of pure nitrogen and hydrogen, by whatever method attained, involves considerable expense, the question arises whether the mixtures of the same with carbon monoxid or carbon dioxid, which can be cheaply and easily produced commercially, are suitable for the purpose in view. From the theoretical standpoint, it would appear that the possibility of so applying these mixtures is very small, for since hydrocyanic acid at high temperatures is capable of reacting with carbon monoxid, according to the equation:

$$2HCN + CO = H_2O + N_2 + 3C,$$

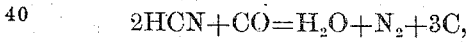

it might certainly be expected that it would not be formed at all in the presence of carbon monoxid or that it would be destroyed by the latter immediately upon its formation. When it is found that this view is contradicted by experiment, the only explanation possible is that the rapidity of the above reaction is not sufficiently great when, under suitable experimental conditions, the gas-mixture is subjected to rapid cooling, as to permit of the decomposition of large quantities of the hydrocyanic acid newly produced. If, for instance, the mixture known as Dowson gas, which consists chiefly of hydrogen, carbon monoxid, nitrogen and a little carbon dioxid, is led over carbon which—by any suitable means—is maintained at a very high temperature, more or less considerable quantities of hydrocyanic acid can be detected in the gases rapidly aspirated from the furnace, according to the degree of temperature at which the process is conducted.

The hydrocyanic acid thus produced can be employed for the production of other cyanogen compounds, or may be transformed into ammonium sulfate by passing it through concentrated sulfuric acid. The hydrogen and nitrogen which have not undergone transformation into hydrocyanic acid together with the carbon monoxid mixed therewith may, after the removal of the acid, be again passed over incandescent carbon for the purpose of obtaining a further yield of hydrocyanic acid, or they may be applied to heating purposes.

An apparatus for carrying the process into practical effect is indicated in the accompanying drawing in which—

*a* is the gas producer (generator) into which steam and air is blown in by the inlets *b*, *c*, while the fuel *d* is introduced by a hopper *e*.

The gas produced in the usual manner escapes by the conduit *f* and enters the electric furnace *g*, which is filled with coke *h* (by means of a hopper *i*).

*k* and *l* are carbon electrodes and *m* and *n* electric conductors which lead to the said electrodes.

*o* is a conduit by which the produced gas is conveyed to the cooler, absorber and gas container, these being not shown by the drawings.

It is to be remarked that the zone marked I of the electric furnace serves for preliminarily heating the coke, while zone II is the electric zone proper.

Dowson gas as commercially produced is not specially well adapted for the production of hydrocyanic acid, on account of its containing more nitrogen than hydrogen. The proportion of hydrogen may, however, be raised by heating the mixture of air and water-vapor previous to its admission to the gas-generator, to as high a temperature as possible, for which purpose the high temperature of the gas-mixture escaping from the converter may be turned to account by the use of suitable regenerative apparatus. Obviously the enriching of the Dowson gas may be attained by means of hydrogen otherwise produced, or by means of water gas, just as, in general, a gas-mixture of the requisite character may be obtained by mixing Dowson gas, water-gas, producer-gas and the like in suitable proportions. Finally a greater or lesser proportion of the carbon monoxid or carbon dioxid contained in the gas mixture can be removed in any suitable manner prior to use. The mixture of nitrogen and hydrogen may be produced in the same apparatus as is used for the production of hydrocyanic acid. If water-vapor and air are simultaneously conducted thereinto, a mixture of carbon monoxid, hydrogen and nitrogen will be first formed under the action of the glowing carbon, whereupon the two latter will combine with the carbon present in the hottest zone of the furnace to form hydrocyanic acid.

In this apparatus also the enriching of the gas-mixture escaping from the Dowson gas-generator with more hydrogen may be effected, for which purpose it is only necessary to mix the further necessary quantity of water-vapor with the gases before or after their passage through the generator. The requisite high temperature of the carbon serving to effect the formation of the hydrocyanic acid is best obtained in an electrical furnace, and any form of electrical heating may be used, whether the electric arc or electrical resistance, and in the latter case the heating may be either internal or external. In the case of an arc furnace the electrodes may themselves furnish the necessary carbon for the formation of the hydrocyanic acid.

Example: Within a generator or producer a so called Dowson gas is produced by blowing in say 3 cubic meters of air and 0.6 kilo steam per 1 kilo carbon. The gas thus produced consists of

| | | | |
|---|---|---|---|
| CO | 27.6 | vol. per cent. | |
| H | 15.3 | " " | " |
| $CH_4$ | 1.4 | " " | " |
| $CO_2$ | 3.9 | " " | " |
| N | 51.8 | " " | " |

This gas is blown into the electric arc-furnace. When it leaves the latter it passes a cooling-device and the absorption apparatus where the HCN is separated, while the remaining waste gases are led to the gas container and may be used again.

When the gas passes through the electric furnace with a velocity of 100–500 liters per kilowatt per hour, a considerably concentrated HCN gas is produced. Instead of separately producing the gas in a producer, one may introduce the above stated proportions of air and steam into the electric furnace directly.

The expression "Dowson gas" used in the specification refers to a gas produced according to the following formulæ:

$$C + O = CO$$
$$C + H_2O = CO + H_2,$$

starting from air and steam.

In the foregoing process the following reaction takes place:

$$H + C + N = HCN.$$

We claim—

1. The process of producing hydrocyanic acid by synthesis by means of highly heated coal, hydrogen and atmospheric nitrogen, consisting in passing over the coal a mixture of hydrogen and nitrogen containing not more than forty per cent. of carbon oxid, substantially as described.

2. The process of producing hydrocyanic acid by synthesis by means of highly heated carbon, hydrogen and atmospheric nitrogen, consisting in passing over the carbon a mixture of hydrogen and atmospheric nitrogen containing carbon oxids, substantially as described.

3. The process of producing hydrocyanic acid by synthesis by means of highly heated carbon, hydrogen and atmospheric nitrogen, consisting in passing over the carbon a mixture of hydrogen and atmospheric nitrogen containing carbon monoxid and dioxid, substantially as described.

4. The process of producing hydrocyanic acid by synthesis by means of highly heated carbon, hydrogen and atmospheric nitrogen, consisting in passing over the carbon a mixture of hydrogen and atmospheric nitrogen containing commercially produced gases in which carbon oxids are introduced in the desired proportions by the admixture of other gases, substantially as described.

In testimony, that we claim the foregoing as our invention, we have signed our names in presence of two witnesses, this second day of April 1908.

OTTO DIEFFENBACH.
WILHELM MOLDENHAUER.

Witnesses:
KARL WEBER,
FRIEDRICH DARMSTÄDTER.